United States Patent [19]

Murata et al.

[11] Patent Number: 4,814,312

[45] Date of Patent: Mar. 21, 1989

[54] METHOD FOR PRODUCTION OF CATALYST COMPONENT FOR OLEFIN POLYMERIZATION

[75] Inventors: Masahide Murata; Masafumi Imai; Hiroyuki Furuhashi; Kouji Maruyama; Hiroshi Ueno, all of Saitama, Japan

[73] Assignee: Toa Nenryo Kogyo Kabushiki Kaisha, Tokyo, Japan

[21] Appl. No.: 132,751

[22] Filed: Dec. 14, 1987

[30] Foreign Application Priority Data

Dec. 26, 1986 [JP] Japan ................... 61-308534

[51] Int. Cl.$^4$ ................................ C08F 4/64
[52] U.S. Cl. ................... 502/111; 502/115; 502/116; 502/121; 502/122; 502/123; 502/125; 502/127
[58] Field of Search ............... 502/111, 115, 116, 121, 502/122, 123, 125, 127

[56] References Cited

U.S. PATENT DOCUMENTS

| | | | |
|---|---|---|---|
| 3,953,414 | 4/1976 | Galli et al. | 526/348 |
| 4,111,835 | 9/1978 | Feschini et al. | 252/429 |
| 4,220,554 | 9/1980 | Scata et al. | 502/125 |
| 4,311,817 | 1/1982 | Morita et al. | 526/124 |
| 4,315,835 | 2/1982 | Scata et al. | 252/429 |
| 4,339,351 | 7/1982 | Mashita et al. | 502/125 X |
| 4,370,257 | 1/1983 | Imai et al. | 502/125 |
| 4,399,054 | 8/1983 | Ferraris et al. | 252/429 B |
| 4,401,589 | 9/1983 | Kioka et al. | 252/429 B |
| 4,613,579 | 9/1986 | Furuhashi et al. | 502/125 X |
| 4,693,990 | 9/1987 | Hiroyuki et al. | 502/125 X |

FOREIGN PATENT DOCUMENTS 045977 2/1982 European Pat. Off. .
137694 2/1981 Japan .

*Primary Examiner*—Patrick P. Garvin
*Attorney, Agent, or Firm*—M. B. Kurtzman

[57] ABSTRACT

A method for the production of a catalyst component for use in the polymerization of an olefin, which method comprises causing a magnesium-containing solid obtained by contact of (A) magnesium metal, (B) a halogenated hydrocarbon represented by the general formula, RX [wherein R stands for an alkyl, aryl, or cycloalkyl group having 1 to 20 carbon atoms and X for a halogen atom], and (C) a compound of the general formula, $X_n^1 M(OR^1)_{m-n}$ [wherein $X^1$ stands for a hydrogen atom, a halogen atom, or a hydrocarbon group having 1 to 20 carbon atoms, M for a boron, carbon, silicon, aluminum, or phosphorus atom, $R^1$ for a hydrocarbon group having 1 to 20 carbon atoms, and m for the valency of said atom M, providing that $m > n \geq 0$ is satisfied], to contact (D) a halogen-containing alcohol and then contact (E) an electron donor type compound and (F) a titanium compound.

11 Claims, No Drawings

METHOD FOR PRODUCTION OF CATALYST COMPONENT FOR OLEFIN POLYMERIZATION

DETAILED DESCRIPTION OF THE INVENTION

1. Field of the Invention

This invention relates to a method for the production of a catalyst component and for its use in the polymerization of an olefin.

2. Description of the Prior Art

A magnesium-supported catalyst having a transition metal component such as titanium deposited on a magnesium compound-containing carrier and intended for use in the polymerization of an olefin has been known to the art. More often than not in the preparation of the catalyst, the carrier therefore is used after it has been mechanically pulverized. In such case, the produced catalyst for polymerization and consequently the polymer obtained therewith consists of particles which are non-uniform in shape.

Recently, a few attempts have been made to improve the shape uniformity of carrier particles. For example, a method which comprises converting an aqueous magnesium chloride solution or dissolved magnesium chloride hydrate ($MgCl_2 \cdot 6H_2O$) through spray drying into spherical particles (U.S. Pat. No. 3,953,414 of Galli et al. issued Apr. 27, 1976, U.S. Pat. No. 4,111,835 of Feschini et al. issued Sept. 5, 1978, and U.S. Pat. No. 4,311,817 of Morita et al. issued Jan. 19, 1982), a method which comprises mutually contacting magnesium metal, a halogenated hydrocarbon, and an electron donor type compound such as an alcohol (Japanese Patent Application disclosure No. SHO 51(1976)-64,586), a method which comprises causing an organic magnesium compound to react with an ester of orthosilicic acid, and a method which comprises causing mutual reaction of an ester of orthosilicic acid and a halogenated hydrocarbon (U.S. Pat. No. 4,220,554 of Scata et al. issued Sept. 2, 1980) have been proposed. Indeed these methods are capable of improving the shapes of carrier particles and a catalyst to some extent. The catalysts they produce, however, are not satisfactory in terms of activity.

The present inventors formerly found that a magnesium-containing solid consisting of particles uniform in shape and effectively serving as a carrier for an olefin polymerization catalyst is obtained by causing contact of magnesium metal, a halogenated hydrocarbon, and a compound of the general formula, $X_mC(OR)_{4-m}$ (U.S. Pat. No. 4,370,257 of Imai et al. issued Jan. 25, 1983). They have consequently developed a catalyst component having an electron donor type compound and a titanium compound deposited on the aforementioned solid (U.S. Pat. No. 4,370,257 of Imai et al. issued Jan. 25, 1983). This catalyst, however, has an unsolved problem concerning the activity for polymerization.

Problem for Solution by the Invention

An object of this invention is to provide a catalyst component for the polymerization of an olefin excelling in the quality of particles and exhibiting efficiency in polymerization on a practical level.

Invention for Solution of the Problem

After a diligent study, the present inventors have found that the object of this invention can be accomplished by providing a catalyst component which is obtained by causing a magnesium-containing solid produced by contact of the magnesium-containing solid disclosed in U.S. Pat. No. 4,370,257 of Imai et al. issued Jan. 25, 1983 and U.S. Pat. No. 4,220,554 of Scata et al. issued Sept. 2, 1980 mentioned above with a halogen-containing alcohol prior to contact of an electron donor type compound and a titanium compound. The present invention has been perfected as the result.

SUMMARY OF THE INVENTION

To be specific, the essence of the present invention resides in a method for the production of a catalyst component for use in the polymerization of an olefin which method comprises causing a magnesium-containing solid obtained by contact of (A) magnesium metal, (B) a halogenated hydrocarbon represented by the general formula, RX, wherein R stands for an alkyl, aryl, or cycloalkyl group having 1 to 20 carbon atoms and X for a halogen atom, and (C) a compound of the general formula, $X_n^1M(OR^1)_{m-n}$ wherein $X^1$ stands for a hydrogen atom, a halogen atom, or a hydrocarbon group having 1 to 20 carbon atoms, M for a boron, carbon, silicon, aluminum, or phosphorus atom, $R^1$ for a hydrocarbon group having 1 to 20 carbon atms, and m for the valency of said atom M, providing that $m > n > 0$ is satisfied, to contact (D) a halogen-containing alcohol and then contact (E) an electron donor type compound and (F) a titanium compound.

Raw Materials for Preparation of Carrier (A) Magnesium metal

Though this invention does not discriminate magnesium metal on account of its form, magnesium metal is used particularly advantageously herein in the form of powder or chips. Preparatory to actual use herein, the magnesium metal is desired to be washed with an inactive hydrocarbon such as, for example, an aliphatic, alicyclic, or aromatic hydrocarbon having 6 to 8 carbon atoms and then dried by heating in the presence of an inactive gas such as nitrogen.

(B) Halogenated hydrocarbon

Of the halogenated hydrocarbons represented by the general formula, RX, particularly desirable are chlorinated or brominated hydrocarbons containing as the substituent, R, an alkyl, aryl, or cycloalkyl group having 1 to 8 carbon atoms. Particularly desirable halogenated hydrocarbons include methyl, ethyl, isopropyl. n-butyl, n-octyl, and cyclohexyl chlorides, bromides, chlorobenzene, and o-chlorotoluene.

(C) Compound of general formula $X_n^1M(OR^1)_{m-n}$

In the formula, the symbols M, $X^1$, $R^1$, m, and n have the same meanings as defined above. The substituent, $X^1$, may be a halogen-substituted hydrocarbon having 1 to 20 carbon atoms, where $X^1$ is a hydrocarbon group, $X^1$ and $R^1$ may be same or different. Hereinafter, the compounds of the aforementioned general formula will be referred to simply as "alkoxy compounds."

As examples of the hydrocarbon group, there can be cited alkyl groups such as methyl, ethyl, propyl, i-propyl, butyl, amyl, hexyl, octyl, 2-ethylhexyl, and decyl, cycloalkyl groups such as cyclopentyl, cyclohexyl, and methylcyclohexyl, alkenyl groups such as allyl, propenyl, and butynyl, aryl groups such as phenyl, tolyl, and xylyl, and aralkyl groups such as phenethyl and 3-phenylpropyl. Among other hydrocarbon groups enumerated above, alkyl groups of 1 to 10 carbon atoms prove to be particularly advantageous.

Illustative alkoxy compounds are:

1. Compounds using a carbon atom as the substituent, M

The compounds of the formula, $C(OR^1)_4$, including $C(OCH_3)_4$, $C(OC_2H_5)_4$, $C(OC_3H_7)_4$, $C(OC_4H_9)_4$, $C(O-i-C_4H_9)_4$, $C(OC_6H_{13})_4$, and $C(OC_8H_{17})_4$; the compounds of the formula, $X^1C(OR^1)_3$, including $HC(OCH_3)_3$, $HC(OC_2H_5)_3$, $HC(OC_3H_7)_3$, $HC(OC_4H_9)_3$, $HC(O-i-C_4H_9)_3$, $HC(OC_6H_{13})_3$, $HC(OC_8H_{17})_3$, $HC(OC_6H_5)_3$; $CH_3C(OCH_3)_3$, $CH_3C(OC_2H_5)_3$, $C_2H_5C(OCH_3)_3$, $C_2H_5C(OC_2H_5)_3$, $C_6H_{11}C(OC_2H_5)_3$, $C_6H_5C(OCH_3)_3$, $C_6H_5C(OC_2H_5)_3$, $C_6H_5C(OC_3H_7)_3$, $C_7H_7C(OC_2H_5)_3$, $C_8H_9C(OC_2H_5)_3$; $CH_2BrC(OC_2H_5)_3$, $CH_2ClC(OC_2H_5)_3$, $CH_3CHBrC(OC_2H_5)_3$, $CH_3CHClC(OC_2H_5)_3$; $ClC(OCH_3)_3$, $ClC(OC_2H_5)_3$, $ClC(OC_3H_7)_3$, $ClC(O-i-C_4H_9)_3$, $ClC(OC_8H_{17})_3$, $ClC(OC_6H_5)_3$, and $BrC(OC_2H_5)_3$; and the compounds of the formula, $X_2^1C(OR^1)_2$, including $CH_3CH(OCH_3)_2$, $CH_3CH(OC_2H_5)_2$, $CH_2(OCH_3)_2$, $CH_2(OC_2H_5)_2$, $CH_2ClCH(OC_2H_5)_2$, $CHCl_2CH(OC_2H_5)_2$, $CCl_3CH(OC_2H_5)_2$, $CH_2BrCH(OC_2H_5)_2$, $CH_2ICH(OC_2H_5)_2$, and $C_6H_5CH(OC_2H_5)_2$.

2. Compounds using a silicon atom as the substituent, M.

The compounds of the formula, $Si(OR^1)_4$, including $Si(OCH_3)_4$, $Si(OC_2H_5)_4$, $Si(OC_4H_9)_4$, $Si(Oi-C_4H_9)_4$, $Si(OC_6H_{13})_4$, $Si(OC_8H_{17})_4$, $Si[O.CH_2CH(C_2H_5)C_4H_9]_4$, and $Si(OC_6H_5)_4$; the compounds of the formula, $RSi(OR^1)_3$, including $HSi(OC_2H_5)_3$, $HSi(OC_4H_9)_3$, $HSi(OC_6H_{13})_3$, $HSi(OC_6H_5)_3$, $CH_3Si(OCH_3)_3$, $CH_3Si(OC_2H_5)_3$, $CH_3Si(OC_4H_9)_3$, $C_2H_5Si(OC_2H_5)_3$, $C_4H_9Si(OC_2H_5)_3$, $C_6H_5Si(OC_2H_5)_3$, $C_2H_5Si(OC_6H_5)_3$, $ClSi(OCH_3)_3$, $ClSi(OC_2H_5)_3$ $ClSi(OC_3H_7)_3$, $ClSi(OC_6H_5)_3$, and $BrSi(OC_2H_5)_3$; the compounds of the formula. $R_2Si(OR^1)_2$, including $(CH_3)_2Si(OCH_3)_2$, $(CH_3)_2Si(OC_2H_5)_2$, $(CH_3)_2Si(OC_3H_7)_2$, $(C_2H_5)_2Si(OC_2H_5)_2$, $(C_6H_5)_2Si(OC_2H_5)_2$, $CH_3ClSi(OC_2H_5)_2$, $CHCl_2SiH(OC_2H_5)_2$, $CCl_3SiH(OC_2H_5)_2$, $CH_3BrSi(OC_2H_5)_2$, and $CH_3ISi(OC_2H_5)_2$; and the compounds of the formula, $R_3SiOR^1$, including $(CH_3)_3SiOCH_3$, $(CH_3)_3SiOC_2H_5$, $(CH_3)_3SiOC_4H_9$, $(CH_3)_3SiOC_6H_5$, $(C_2H_5)_3SiOC_2H_5$, and $(C_6H_5)_3SiOC_2H_5$.

3. Compounds using a boron atom as the substituent, M

The compounds of the formula, $B(OR^1)_3$, including $B(OC_2H_5)_3$, $B(OC_4H_9)_3$, $B(OC_6H_{13})_3$, and $B(OC_6H_5)_3$.

4. Compounds using an aluminum atom as the substituent, M

The compounds of the formula, $Al(OR^1)_3$, including $Al(OCH_3)_3$, $Al(OC_2H_5)_3$, $Al(OC_3H_7)_3$, $Al(Oi-C_3H_7)_3$, $Al(OC_4H_9)_3$, $Al(Ot-C_4H_9)_3$, $Al(OC_6H_{13})_3$, and $Al(OC_6H_5)_3$.

5. Compounds using a phosphorus atom as the substituent, M

The compounds of the formula, $P(OR^1)_3$, including $P(OCH_3)_3$, $P(OC_2H_5)_3$, $P(OC_4H_9)_3$, $P(OC_6H_{13})_3$, and $P(OC_6H_5)_3$.

(D) Halogen-containing alcohol

The term "halogen-containing alcohol" as used in the present invention means a compound obtained from a monohydric or polyhydric alcohol possessing one or more hydroxyl groups in the molecular unit thereof by substituting a halogen atom for at least one freely selected hydrogen atom other than the hydrogen atom of the hydroxyl group. As examples of the halogen atom, there can be cited chlorine, bromine, iodine, and fluorine atoms. Among other halogen atoms cited above, the chlorine atom proves to be particularly advantageous.

As examples of the compound of the foregoing definition, there can be cited 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propane diol, 2-chlorocyclohexanol, 4-chlorobenzhydrol, (m,o,p)-chlorobenzyl alcohol, 4-chlorocatechol, 4-chloro-(m,o)-cresol, 6-chloro-(m,o)-cresol, 4-chloro-3,5-dimethyl phenol, chlorohydroquinone, 2-benzyl-4-chlorophenol, 4-chloro-1-naphthol, (m,o,p)-chlorophenol, p-chloro-α-methylbenzyl allcohol, 2-chloro-4-phenyl phenol, 6-chlorothymol, 4-chlororesorcinol, 2-bromoethanol, 3-bromo-1-propanol, 1-bromo-2-propanol, 1-bromo-2-butanol, 2-bromo-p-cresol, 1-bromo-2-naphthol, 6-bromo-2-naphthol, (m,o,p)-bromophenol, 4-bromoresorcinol, (m,o,p)-fluorophenol, p-iodophenol; 2,2-dichloroethanol, 2,3-dichloro-1-propanol, 1,3-dichloro-2-propanol, 3-chloro-1-(α-chloromethyl)-1-propanol, 2,3-dibromo-1-propanol, 1,3-dibromo-2-propanol, 2,4-dibromophenol, 2,4-dibromo-1-naphthol; 2,2,2-trichloroethanol, 1,1,1-trichloro-2-propanol, β,β,β-trichloro-tert-butanol, 2,3,4-trichlorophenol, 2,4,5-trichlorophenol, 2,4,6-trichlorophenol, 2,4,6-tribromophenol, 2,3,5-tribromo-2-hydroxy toluene, 2,3,5-tribromo-4-hydroxy toluene, 2,2,2-trifluoroethanol. α,α,α-trifluoro-m-cresol, 2,4,6-triiodophenol, 2,3,4,6-tetrachlorophenol, tetrachlorohydroquinone, tetrachloro-bis-phenol A, tetrabromo-bis-phenol A, 2,2,3,3-tetrafluoro-1-propanol, 2,3,5,6-tetrafluorophenol, and tetrafluororesorcinol.

(E) Electron donor type compound

As electron donor type compounds, there can be cited carboxylates, carboxylic anhydrides, carboxylic acid esters, carboxylic acid halogenides, alcohols, ethers, ketones, amines, amides, nitriles, aldehydes, alcoholates, phosphorous, arsenic, and antimony compounds coupled through the medium of carbon or oxygen with organic groups. phosphamides, thioethers, thioesters, and carbonic esters. Among other electron donor type compounds enumerated above, carboxylates, carboxylic anhydrides, carboxylic acid esters, carboxylic acid halogenides, alcohols, and ethers are used particularly advantageously.

As concrete examples of the carboxylic acid, there can be cited aliphatic monocarboxylic acids such as formic acid, acetic acid, propionic acid, butyric acid, isobutyric acid, valeric acid, caproic acid, pivalic acid, acrylic acid, methacrylic acid, and crotonic acid, aliphatic dicarboxylic acids such as malonic acid, succinic acid, glutaric acid, adipic acid, sebacic acid, maleic acid, and fumaric acid, aliphatic oxycarboxylic acids such as tartaric acid, alicyclic carboxylic acids such as cyclohexane monocarboxylic acids, cyclohexene monocarboxylic acids, cis-1,2-cyclohexane dicarboxylic acids, cis-4-methylcyclohexane-1,2-dicarboxylic acids, aromatic monocarboxylic acids such as benzoic acid, toluic acid, anisic acid, p-tertiary butylbenzoic acid, naphthoic acid, and cinnamic acid, and aromatic polycarboxylic acids such as phthalic acid, isophthalic acid, terephthalic acid, naphthalic acid, trimellitic acid, hemimellitic acid, trimesic acid, pyromellitic acid, and mellitic acid.

As carboxylic anhydrides, the anhydrides of the carboxylic acids enumerated above can be used.

As carboxylic acid esters, the monoesters and polyesters of the carboxylic acids cited above can be used. As concrete examples of the carboxylic acid ester, there can be cited butyl formate, ethyl acetate, butyl acetate, isobutyl isobutyrate, propyl pivalate, isobutyl pivalate, ethyl acrylate, methyl methacrylate, ethyl methacrylate. isobutyl methacrylate, diethyl malonate, diisobutyl malonate, diethyl succinate, dibutyl succinate, diisobutyl succinate, diethyl glutarate, diisobutyl glutarate, diisobutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexane carboxylate, methyl benzoate, ethyl benzoate, methyl p-toluate, ethyl p-tertiary butyl benzoate, ethyl p-anisate, ethyl α-naphthoate, isobutyl α-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate, dibutyl naphthalate, triethyl trimellitate, tributyl trimellitate, tetramethyl pyromellitate, tetraethyl pyromellitate, and tetrabutyl pyromellitate.

As carboxylic acid halogenides, the halogenides of the aforementioned carboxylic acids can be used. As concrete examples of the carboxylic acid halogenide, there can be cited acetic acid chloride, acetic acid bromide, acetic acid iodide, propionic acid chloride, butyric acid chloride, butyric acid bromide, butyric acid iodide, pivalic acid chloride, pivalic acid bromide, acrylic acid chloride, acrylic acid bromide, acrylic acid iodide, methacrylic acid chloride, methacrylic acid bromide, methacrylic acid iodide, crotonic acid chloride, maleic acid chloride, malonic acid chloride, malonic acid bromide, succinic acid chloride, succinic acid bromide, glutaric acid chloride, glutaric acid bromide, adipic acid chloride, adipic acid bromide, sebacic acid chloride, sebacic acid bromide, maleic acid chloride, maleic acid bromide, fumaric acid chloride, fumaric acid bromide, tartaric acid chloride, tartaric acid bromide. cyclohexane carboxylic acid chloride, cyclohexane carboxylic acid bromide, 1-cyclohexene carboxylic acid chloride, cis-4-methylcyclohexene carboxylic acid chloride, cis-4-methylcyclohexene carboxylic acid bromide, benzoyl chloride, benzoyl bromide, p-toluic acid bromide, p-toluic acid chloride, p-anisic acid bromide, α-naphthoic acid chloride, cinnamic acid chloride, cinnamic acid bromide, phthalic acid dichloride, phthalic acid dibromide, isophthalic acid dichloride, isophthalic acid dibromide, terephthalic acid dichloride, and naphthalic acid dichloride. Such monoalkyl halogenides of dicarboxylic acids as adipic acid monomethyl chloride, maleic acid monoethyl chloride, maleic acid monomethyl chloride, and phthalic acid butyl chloride can also be used.

The alcohols are represented by the general formula, ROH. In the formula. R stands for alkyl, alkenyl, cycloalkyl, aryl, or aralkyl having 1 to 12 carbon atoms. Concrete examples of alcohol include methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethyl phenol, isopropyl phenol, p-tertiary butyl phenol, and n-octyl phenol. The ethers are represented by the general formula, $ROR^1$. In the formula, R and $R^1$ independently stand for an alkyl, alkenyl, cycloalkyl, aryl, or aralkyl having 1 to 12 carbon atoms. R and $R^1$ may be equal or unequal. Concrete examples of the ether include diethyl ether, diisopropyl ether, dibutyl ether, diisobutyl ether, diisoamyl ether, di-2-ethylhexyl ether, diallyl ether, ethylallyl ether, butylallyl ether, diphenyl ether, anisole, and ethylphenyl ether. Any compound selected from the aforementioned halogen-containing alcohols can be also used.

(F) Titanium compound

The term "titanium compound" as used herein means a compound of divalent, trivalent, or tetravalent titanium. As concrete examples of the titanium compound, there can be cited titanium tetrachloride, titanium tetrabromide, trichloroethoxy titanium, trichlorobutoxy titanium, dichlorodiethoxy titanium, dichlorodibutoxy titanium, dichlorodiphenoxy titanium, chlorotriethoxy titanium, chlorotributoxy titanium, tetrabutoxy titanium, and titanium trichloride. Among other titanium compounds cited above, such tetravalent titanium halogenides as titanium tetrachloride, trichloroethoxy titanium, dichlorodibutoxy titanium, and dichlorodiphenoxy titanium prove to be particularly desirable, titanium tetrachloride being the most desirable choice.

Procedure for Preparation of Catalyst Component

The catalyst component according with the present invention is obtained by placing magnesium metal, a halogenated hydrocarbon, and an alkoxy compound into mutual contact thereby producing a magnesium-containing solid, allowing a halogen-containing alcohol (Component A) to come into contact with the magnesium-containing solid, and then allowing an electron donor type compound (Component B) and a titanium compound (Component C) further to come into contact therewith.

(1) Contact among magnesium, halogenated hydrocarbon, and alkoxy compound

The method for establishing contact among the three components is not specifically limited. Virtually any method can be adopted for this contact. This contact can be accomplished, for example, by (1) a method which comprises simultaneously placing the three components into mutual contact, (2) a method which comprises preparatorily allowing magnesium metal to come into contact with the halogenated hydrocarbon and subsequently allowing the product of this contact or a compound obtained in advance by the contact of the two components, such as, for example, any of the compounds represented by the formulas, $ClMgCH_3$, $ClMgC_2H_5$, $ClMgC_3H_7$, $ClMgC_4H_9$, $ClMgi—C_4H_9$, $ClMgC_6H_{13}$, $ClMgC_8H_{17}$, $BrMgC_2H_5$, $BrMgC_4H_9$, $BrMgi—C_4H_9$, $IMgC_4H_9$, $ClMgC_6H_5$, and $BrMgC_6H_5$, which are known as Grignard reagents, to come into contact with the alkoxy compound, (3) a method which comprises suspending magnesium metal in a solution of the alkoxy compound and adding a solution of the halogenated hydrocarbon to the resultant suspension, or (4) a method which comprises placing the alkoxy compound and the halogenated hydrocarbon into mutual contact and subsequently adding magnesium metal to the product of the contact, for example.

The ratio of the amounts of the alkoxy compound and magnesium metal to be used is desired to be such that the number of $OR^1$ groups in the alkoxy compound per magnesium atom in the magnesium metal exceeds 1 and preferably falls in the range of 3 to 5. In the case of an alkoxy compound represented by the formula, $X_2^1C(OR^1)_2$, for example, the amount of the alkoxy compound is desired to exceed 0.5 mol, or preferably falls in the range of 1.5 to 2.5 mols, per gram atom of magnesium. In the case of an alkoxy compound represented by the formula, $X^1C(OR^1)_3$, the amount of the alkoxy compound is desired to exceed $\frac{1}{3}$ mol, or preferably falls in the range of $\frac{1}{2}$ to 5/3 mols, per gram atom of magnesium. The amount of the halogenated hydrocarbon to be used is desired to fIll in the range of 1 to 2 mols per gram atom of magnesium.

The contact reaction of the foregoing description is accomplished by stirring the combined components under such conditions that the contact temperature falls in the range of 40° to 250° C., preferably 60° to 120° C., and the contact time falls in the range of 1 to 10 hours. This reaction may be carried out, when desired, in the presence of the same inactive hydrocarbon such as, for example, an aliphatic, alicyclic, or aromatic hydrocarbon having 6 to 8 carbon atoms, as used in the drying of magnesium metal.

It is permissible, for the purpose of promoting this reaction, to use iodine, an alkyl iodide, or an inorganic halide such as calcium chloride, copper chloride, manganese chloride, or a hydrogen halogenide.

The solid product prepared by the reaction described above may be cleaned with a suitable cleaning agent such as, for example, the aforementioned inactive hydrocarbon before it is subjected to contact with the halogen-containing alcohol.

(2) Contact with halogen-containing alcohol

Desirably, the contact of the magnesium-containing solid obtained as described in (1) above with the halogen-containing alcohol (Component A) is accomplished by stirring the two components in the presence of an inactive medium. Examples of the inactive medium usable for this purpose include hydrocarbons such as pentane, hexane, heptane, octane, decane, cyclohexane, benzene, toluene, and xylene and halogenated hydrocarbons such as 1,2-dichloroethane, 1,2-dichloropropane, carbon tetrachloride, butyl chloride, isoamyl chloride, bromobenzene, and chlorotoluene.

The contact of the two components is generally carried out at a temperature in the range of $-20°$ C. to $+150°$ C. for a period in the range of 0.1 to 100 hours. Hhen the contact entails evolution of heat, there can be adopted a method which comprises first bringing the two components into mutual contact gradually at a low tmperature, elevating the temperature of the reaction system after the two components have been wholly added to each other, and subsequently continuing the contact.

The amount of Component A to be used is generally in the range of 0.05 to 20 gram mols, preferably 0.1 to 10 gram mols, per gram atom of magnesium in the solid.

The solid product which is obtained by the contact of the aforementioned solid with Component A is destined to undergo the subsequent contact. It may be washed, when necessary, with the aforementioned inactive medium prior to the contact.

(3) Contact with electron donor type compound and titanium compound

The contact of the solid product mentioned above with the electron donor type compound (Component B) and the titanium compound (Component C) can be effected by (1) a method which comprises bringing the solid product into contact first with Component B and then with Component C, (2) a method which comprises bringing the solid product into contact first with Component C and then with Component B, or (3) a method which comprises bringing Component B and Component C simultaneously into contact with the solid product.

Each of the contacts mentioned above is accomplished by combining and stirring the relevant components in the presence or absence of an inactive medium. As the inactive medium, any of the aforementioned compounds can be used.

The contact of the solid product with Component B and Component C is carried out generally at a temperature in the range of 0° to 200° C. for a period in the range of 0.5 to 20 hours. The amount of Component B to be used is in the range of 0.005 to 10 gram mols, preferably 0.01 to 1 gram mol, per gram atom of magnesium in the solid product. The amount of Component C to be used is required to exceed 0.1 gram mol, preferably to fall in the range of 1 to 50 gram mols, per gram atom of magnesium in the solid product.

The contact of the solid product with Component C may be carried out two or more times as occasion demands. The contact can be effected by any of the methods described above. The product of the first contact may be washed, as required, with an inactive medium and mixed anew with Cmponent C (and the medium) for contact.

By the procedure described above, the catalyst component according with the present invention can be produced. This catalyst component, when necessary, may be washed with such a hydrocarbon as hexane, heptane, octane, cyclohexane, benzene, toluene, or xylene and may further be dried as occasion demands.

The catalyst component according with the present invention possesses a quality such that the specific surface area measured by the BET method at the adsorption temperature of liquefied nitrogen falls in the range of 10 to 1,000 m²/g, the pore volume is in the range of 0.05 to 5 cm³/g, the particle size distribution is narrow, and the particles are uniform. The percentage composition of the catalyst component is such that the magnesium content is 1 to 25% by weight, the titanium content 0.5 to 10% by weight, and the chlorine content 4 to 80% by weight.

Catalyst for polymerization of olefin

The catalyst component obtained by the present invention is combined with an organic compound of a metal from Groups I through III of the Periodic Table of Elements to produce a catalyst for use in the homopolymerization of an olefin or the copolymerization of one olefin with another olefin.

Organic compound of metal from Groups I through III

As the organic metal compound, there can be used any of the organic compounds of lithium, magnesium, calcium, zinc, and aluminum. Among other organic metal compounds cited above, organic aluminum compounds prove to be particularly suitable. The organic aluminum compounds which are usable herein are those represented by the general formula, $R_nAlX_{3-n}$ (wherein R stands for an alkyl group or an aryl group, X for a halogen atom, an alkoxy group, or a hydrogen atom, and n for a number in the range of $1<n<3$). For example, alkyl aluminum compounds having 1 to 18 carbon atoms, preferably 2 to 6 carbon atoms, such as trialkyl aluminums, dialkyl aluminum monohalides, monoalkyl aluminum dihalides, alkyl aluminum sesquihalides, dialkyl aluminum monoalkoxides, and dialkyl aluminum monohydrides, mixtures of such alkyl aluminum compounds, and complexes thereof prove to be particularly desirable.

As concrete examples of the alkyl aluminum compounds, there can be cited trialkyl aluminums such as trimethyl aluminum, triethyl aluminum, tripropyl aluminum, triisobutyl aluminum, and trihexyl aluminum, dialkyl aluminum monohalide such as dimethyl aluminum chloride, diethyl aluminum chloride, diethyl aluminum bromide, diethyl aluminum iodide, and diisobutyl aluminum chloride, monoalkyl aluminum dihalides such as methyl aluminum dichloride, ethyl aluminum dichloride, methyl aluminum dibromide, ethyl aluminum dibromide, ethyl aluminum diiodide, and isobutyl aluminum dichloride, alkyl aluminum sesquihalides such as ethyl aluminum sesquichloride, dialkyl aluminum monoalkoxides such as dimethyl aluminum ethoxide, diethyl aluminum ethoxide, diethyl aluminum phenoxide, dipropyl aluminum ethoxide, diisobutyl aluminum ethoxide, and diisobutyl aluminum phenoxide. and dialkyl aluminum hydrides such as dimethyl aluminum hydride, diethyl aluminum hydride, dipropyl aluminum hydride, and diisobutyl aluminum hydride. Among other organic aluminum compounds cited above, trialkyl aluminums, particularly triethyl aluminum and triisobutyl aluminum, prove to be particularly desirable. Such a trialkyl aluminum can be used in combination with some other readily commercially available aluminum organic compounds such as, for example, diethyl aluminum chloride, ethyl aluminum dichloride, ethyl aluminum sesquichloride, diethyl aluminum ethoxide, or diethyl aluminum hydride, or a mixture thereof, or a complex thereof.

An organic aluminum compound of the kind having two or more aluminum atoms coupled therein through the medium of an oxygen atom or a nitrogen atom can be also used. As examples of the compound of this description, there can be cited:

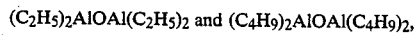

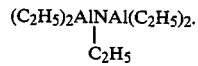

Organic compounds of metals other than aluminum metal include diethyl magnesium, ethyl magnesium chloride, zinc diethyl, LiAl(C$_2$H$_5$)$_4$, and LiAl(C$_7$H$_{15}$)$_4$, for example.

Though the organic metal compound can be used by itself, it may be used in combination with the electron donor type compound. As the electron donor type compound, any of the compounds cited previously as examples of the compound usable as Component (E) for the preparation of the catalyst component can be used. Otherwise, the electron donor type compound may be selected from those electron donor type compounds formed of organic silicon compounds and those electron donor type compounds containing a hetero atom such as nitrogen, sulfur, oxygen, or phosphorus.

As concrete examples of the organic silicon compound, there can be cited tetramethoxy silane, tetraethoxy silane, tetrabutoxy silane, tetraisobutoxy silane, tetraphenoxy silane, tetra(p-methylphenoxy) silane, tetrabenzyloxy silane, methyl trimethoxy silane, methyl triethoxy silane, methyl tributoxy silane, methyl triphenoxy silane, ethyl triethoxy silane, ethyl triisobutoxy silane, ethyl triphenoxy silane, butyl trimethoxy silane, butyl triethoxy silane, butyl tributoxy silane, butyl triphenoxy silane, isobutyl triisobutoxy silane, vinyl triethoxy silane, allyl trimethoxy silane, phenyl trimethoxy silane, phenyl triethoxy silane, benzyl triphenoxy silane, methyl triallyloxy silane, dimethyl dimethoxy silane, dimethyl diethoxy silane, dimethyl diisopropoxy silane, dimethyl dibutoxy silane, dimethyl dihexyloxy silane, dimethyl diphenoxy silane, diethyl diethoxy silane, diethyl diisobutoxy silane, diethyl diphenoxy silane, dibutyl diisopropoxy silane, dibutyl dibutoxy silane, dibutyl diphenoxy silane, diisobutyl diethoxy silane, diisobutyl diisobutoxy silane, diphenyl dimethoxy silane, diphenyl diethoxy silane, diphenyl dibutoxy silane, dibenzyl diethoxy silane, divinyl diphenoxy silane, diallyl dipropoxy silane, diphenyl diallyloxy silane, methylphenyl dimethoxy silane, and chlorophenyl diethoxy silane.

As concrete examples of the electron donor type compound containing a hetero atom, there can be cited nitrogen atom-containing compounds such as 2,2,6,6-tetramethyl piperidine 2,6-dimethyl piperidine, 2,6-diethyl piperidine, 2,6-diisopropyl piperidine, 2,2,5,5-tetramethyl pyrrolidine, 2,5-dimethyl pyrrolidine, 2,5-diethyl pyrrolidine, 2,5-diisopropyl pyrrolidine, 2-methyl pyridine, 3-methyl pyridine, 4-methyl pyridine, 1,2,4-trimethylpiperidine, 2,5-dimethyl piperidine, methyl nicotinate, ethyl nicotinate, nicotinic acid amide, benzoic acid amide, 2-methyl pyrrole, 2,5-dimethyl pyrrole, imidazole, toluic acid amide, benzonitrile, acetonitrile, aniline, paratoluidine, orthotoluidine, metatoluidine, triethyl amine, diethyl amine, dibutyl amine, tetramethylene diamine, and tributyl amine, sulfur atom-containing compounds such as thiophenol, thiophene, ethyl 2-thiophene carboxylates, ethyl 3-thiophene carboxylates, 2-methyl thiophene, methyl mercaptan, isopropyl mercaptan, butyl mercaptan, diethyl thio ether, diphenyl thio ether, methyl benzene sulfonate, methyl sulfite, and ethyl sulfite, oxygen atom-containing compounds such as tetrahydrofuran, 2-methyl tetrahydrofuran, 3-methyl tetrahydrofuran, 2-ethyl tetrahydrofuran, dioxane, dimethyl ether, diethyl ether, dibutyl ether, diisoamyl ether, diphenyl ether, anisole, acetophenone, acetone, methylethyl ketone, acetyl acetone, ethyl 2-furalate, isoamyl 2-furalate, methyl 2-furalate, and propyl 2-furalate, and phosphorus atom-containing compounds such as triphenyl phosphine, tributyl phosphine, triphenyl phosphite, tribenzyl phosphite, diethyl phosphate, and diphenyl phosphate.

Two or more such electron donor type compounds may be used in a combined state. The electron donor type compound of this description may be used when the organic metal compound and the catalyst component are used in combination or it may be used after it has been brought into contact with the organic metal compound in advance.

The amount of the organic metal compound to be used in combination with the catalyst component according with the present invention is generally in the range of 1 to 2,000 gram mols, preferably 20 to 500 gram mols per gram atom of titanium in the catalyst component.

The ratio of the amounts of the organic metal compound and the electron donor type compound is so selected that the amount of the organic metal compound as aluminum falls in the range of 0.1 to 40 gram atoms, preferably 1 to 25 gram atoms, per mol of the electron donor type compound.

Polymerization of Olefin

The catalyst which is composed of the catalyst component obtained as described above and the organic metal compound (and the electron donor type compound) is useful as a catalyst for the homopolymerization of a monoolefin having 2 to 10 carbon atoms or for the copolymerization of the monoolefin with another monoolefin or a diolefin having 3 to 10 carbon atoms. It exhibits a highly desirable performance as a catalyst particularly for the homopolymerization of an α-olefin having 3 to 6 carbon atoms such as, for example, propylene, 1-butene, 4-methyl-1-pentene, or 1-hexene or the random or block copolymerization between two such α-olefins as mentioned above or between such an α-olefin and ethylene.

The polymerization reaction can be carried out effectively in a gaseous phase or a liquid phase. In the liquid phase, the polymerization can be carried out in an inactive hydrocarbon such as normal butane, isobutane, normal pentane, isopentane, hexane, heptane, octane, cyclohexane, benzene, toluene, or xylene and a liquid monomer. The polymerization temperature is generally in the range of $-80°$ to $+150°$ C., preferably $40°$ to $120°$ C. The polymerization pressure is sufficient in the range of 1 to 60 atmospheres. The control of the molecular weight of the polymer to be obtained is effected by carrying out the polymerization in the presence of hydrogen or some other known molecular weight regulating agent. In the copolymerization, the amount of the comonomeric olefin given to be copolymerized with the main olefin is generally up to 30% by weight, preferably in the range of 0.3 to 15% by weight. The polymerization reaction by the use of the catalyst system of the present invention can be carried out continuously or batchwise under the conditions normally adopted for any polymerization. The copolymerization reaction may be carried out in a single stage or in two or more stages.

Effect of the Invention

The catalyst component to be obtained by the present invention functions effectively as a catalyst component in the production of a polyolefin, particularly isotactic polypropylene, a random copolymer of ethylene with propylene, or a block copolymer of ethylene with propylene.

The polymerization catalyst which uses the catalyst component according with the present invention possesses high polymerization activity and high stereoregularity and the olefin polymer powder to be obtained possesses a high bulk density. Further, this polymer powder abounds in flowability.

EXAMPLES

Now, the present invention will be described more specifically below with reference to the following examples and applied examples. Wherever the term "percent (%)" is used in these examples, it shall be construed as meaning a percent by weight unless otherwise specified.

The PSDI of the catalyst component was determined by measuring the particle size distribution of a sample with a particle sizer, a product of Malvern Corp. marketed under trademark designation of "MALVERN 3600," and carrying out a calculation of the following formula using the results of the measurement.

$$PSDI = \log \frac{\text{Particle diameter of particles accounting for 90\% of cumulative weight}}{\text{Particle diameter of particles accounting for 10\% of cumulative weight}}$$

The heptane insoluble content indicating the proportion of crystalline polymer in the polymer (hereinafter referred to simply as "HI") represents the amount of residue after 6 hours extraction of a sample with boiling n-heptane in a modified Soxhlet extractor. The melt-flow rate (MFR) was determined in accordance with the method defined in ASTM D1238. The bulk density was determined by Method A defined in ASTM D1895-69.

The particle size distribution of the polymer was measured with the standard sieves specified by W. S. Tyler Corp. The PSDI value consequently found was reported as the index of the particle size distribution.

EXAMPLE 1

Preparation of magnesium-containing solid

In a reaction vessel provided with a reflux condenser and having an inner volume of 1 liter, 12.8 g of magnesium metal chips (purity 99.5% and average particle diameter 1.6 mm) and 250 ml of n-hexane were placed under an atmosphere of nitrogen gas and stirred at 68° C. for one hour. Then, the magnesium metal was taken out of the resultant mixture and dried at 65° C. under a vacuum to obtain preactivated magnesium metal.

Subsequently, a suspension obtained by adding to the magnesium metal 88 ml (0.53 mol) of ethyl ortho-formate [HC(OC$_2$H$_5$)$_3$] and 0.5 ml of a methyl iodide solution of 10% of iodine was held at 55° C. The suspension and a 5-ml portion of a solution of 80 ml (0.8 mol) of n-butyl chloride in 100 ml of n-hexane added dropwise thereto were stirred for 50 minutes. Then, the remainder of the aforementioned solution was added dropwise thereto over a period of 80 minutes. The resultant combined liquid was stirred at 70° C. for four hours to undergo a reaction. Consequently, there was obtained a solid reaction product.

This reaction product was washed six times each with 300 ml of n-hexane at 50° C. and dried under a vacuum at 60° C. for one hour, to recover 55.6 g of white powdery magnesium-containing solid. This solid was found to contain 22.5% of magnesium and 34.0% of chlorine.

Contact with 2,2,2-trichloroethanol

In a reaction vessel provided with a reflux condenser, a stirrer and a dropping funnel and having an inner volume of 300 ml, 6.3 g of the magnesium-containing solid and 50 ml of n-heptane were placed under an atmosphere of nitrogen gas to form a suspension. This suspension was kept stirred at room temperature and a mixed solution of 2.0 ml (0.02 m.mol) of 2,2,2-trichloroethanol and 11 ml of n-heptane was added to the suspension through the dropping funnel over a period of 30 minutes. The resultant combined liquid was stirred at 80° C. for one hour. The solid consequently formed in the stirred liquid was separated by filtration, washed four times each with 100 ml of n-hexane at room temperature and further washed two times each with 100 ml of toluene, to produce a solid component.

Contact with titanium tetrachloride and di-n-butyl phthalate

To the solid component mentioned above, 40 ml of toluene was added and titanium tetrachloride was added in an amount calculated to give a volumetric titanium tetrachloride/toluene ratio of 3/2. The resultant combined liquid was heated to 90° C. The hot mixture was kept stirred and a mixed solution of 2 ml of di-n-butyl phthalate and 5 ml of toluene was added dropwise to the hot mixture over a period of five minutes. The resultant mixture was stirred at 120° C. for two hours. The solid product consequently obtained in the mixture was separated by filtration and washed at 90° C. two times each with 100 ml of toluene. Further, the washed solid product and titanium tetrachloride added thereto in an amount calculated to give a voluminal volumetric titanium tetrachloride/toluene ratio of 3/2 were stirred at 120° C. for two hours. The solid substance consequently formed therein was separated by filtration at 110° C. and washed seven times each with 100 ml of n-hexane at room temperature, to obtain 5.5 g of a catalyst component.

This catalyst component was found to have a specific surface area of 293 m$^2$/g and contain 1.95% of titanium, 24.1% of magnesium, and 70.8 % of chlorine. The average particle diameter of this catalyst component was 23 $\mu$m and the PSDI thereof was 0.31.

EXAMPLE 2

Preparation of magnesium-containing solid

By following the procedure of Example 1, 8.3 g of magnesium metal was activated. Then, a suspension obtained by adding to the magnesium metal 140 ml of n-butyl ether and 0.5 ml of methyl iodide solution of 10% of iodine was kept at 55° C. To the suspension, a solution of 38.5 ml of n-butyl chloride in 50 ml of n-butyl ether was added dropwise over a period of 50 minutes. The resultant combined liquid was stirred at 70° C. for four hours to undergo a reaction. The reaction solution was kept at 55° C.

Then, 55.7 ml of HC(OC$_2$H$_5$)$_3$ was added dropwise to the reaction solution over a period of one hour. At this time, a solid was observed to form therein. After the dropwise addition was completed, the reaction mixture was left reacting at 60° C. for 15 minutes. The solid resulting from the reaction was washed six times each with 300 ml of n-hexane and dried under a vacuum at room temperature for one hour, to recover 31.6 g of a magnesium-containing solid having a magnesium content of 19.0% and a chlorine content of 28.9%.

Contact with 2,2,2-trichloroethanol

A solid component was obtained by following the procedure of Example 1, excepting 6.3 g of the magnesium-containing solid obtained as described above was used instead.

Contact with titanium tetrachloride and di-n-butyl phthalate

Contact with titanium tetrachloride and di-n-butyl phthalate was effected by following the procedure of Example 1, except the solid component obtained as described above was used instead. Consequently, there was produced a catalyst component having a specific surface area of 285 m$^2$/g, a titanium content of 2.01%, a magnesium content of 24.2%, a chlorine content of 71.0%, an average particle diameter of 22 $\mu$m, and a PSDI value of 0.32.

EXAMPLES 3-8

Catalyst components possessing the compositions and physical properties indicated below were obtained by following the procedure of Example 1, except the varying alkoxy compounds indicated below were used in the place of HC(OC$_2$H$_5$)$_3$.

| Example | Alkoxy Compound | Titanium Content (%) | Average Particle Diameter ($\mu$m) | PSDI |
|---|---|---|---|---|
| 3 | CH$_3$CH(OC$_2$H$_5$)$_2$ | 2.1 | 29 | 0.38 |
| 4 | C(OC$_2$H$_5$)$_4$ | 1.9 | 17 | 0.45 |
| 5 | Si(OC$_2$H$_5$)$_4$ | 2.5 | 7 | 0.32 |
| 6 | Al(OC$_2$H$_5$)$_3$ | 1.7 | 13 | 0.40 |
| 7 | B(OC$_2$H$_5$)$_3$ | 2.4 | 18 | 0.37 |
| 8 | P(OC$_2$H$_5$)$_3$ | 2.3 | 17 | 0.36 |

EXAMPLES 9 THROUGH 12

Catalyst components possessing the compositions and physical properties indicated below were obtained by following the procedure of Example 1, except the halogen-containing alcohols indicated below were used in the place of 2,2,2-trichloroethanol.

| Example | Halogen-Containing Alcohol | Titanium Content (%) | Average Particle Diameter ($\mu$m) | PSDI |
|---|---|---|---|---|
| 9 | 1,1,1-Trichloro-2-propanol | 2.7 | 27 | 0.39 |
| 10 | 2,2-Dichloroethanol | 3.0 | 21 | 0.40 |
| 11 | p-Chlorophenol | 2.1 | 24 | 0.41 |
| 12 | 1-Bromo-2-Butanol | 2.5 | 26 | 0.50 |

EXAMPLES 13 THROUGH 15

Catalyst components possessing the compositions and physical properties indicated below were obtained by following the procedure of Example 1, except the amount of 2,2,2-trichloroethanol (TCE) was varied as indicated below.

| Example | Amount of TCE Used | Titanium Content (%) | Average Particle Diameter ($\mu$m) | PSDI |
|---|---|---|---|---|
| 13 | 1 | 1.7 | 23 | 0.38 |
| 14 | 4 | 2.8 | 29 | 0.46 |
| 15 | 6 | 3.3 | 31 | 0.53 |

EXAMPLES 16 AND 17

Catalyst components possessing the compositions and physical properties indicated below were obtained by following the procedure of Example 1, except the electron donor compounds indicated below were used in the place of di-n-butyl phthalate.

| Example | Electron Donor Type Compound | Titanium Content (%) | Average Particle Diameter ($\mu$m) | PSDI |
|---|---|---|---|---|
| 16 | Ethyl Benzoate | 1.9 | 22 | 0.32 |
| 17 | p-Cresol | 2.2 | 23 | 0.32 |

COMPARATIVE EXPERIMENT 1

A catalyst component was obtained by following the procedure of Example 1, except the contact with 2,2,2-trichloroethanol was omitted. This catalyst component had a titanium content of 1.3%, an average particle diameter of 17 μm, and a PSDI value of 0.38.

APPLIED EXAMPLES 2 THROUGH 19

Propylene was polymerized by following the procedure of Applied Example 1, except the catalyst components obtained in Examples 2 through 17, Comparative Experiment 1, and Comparative Experiment 2 were used in the place of the catalyst component obtained in Example 1. The results were as shown below.

| Applied Example | Catalyst Component | Kc (g/g-cat) | HI (%) | MFR (g/10 min.) | Bulk Density (g/cm³) | PSDI |
|---|---|---|---|---|---|---|
| 2 | Example 2 | 20700 | 97.2 | 5.1 | 0.40 | 0.27 |
| 3 | Example 3 | 17600 | 96.3 | 4.8 | 0.40 | 0.36 |
| 4 | Example 4 | 18600 | 96.8 | 5.3 | 0.39 | 0.40 |
| 5 | Example 5 | 19000 | 95.5 | 6.2 | 0.41 | 0.30 |
| 6 | Example 6 | 15300 | 95.7 | 7.3 | 0.38 | 0.37 |
| 7 | Example 7 | 15900 | 96.2 | 6.6 | 0.38 | 0.35 |
| 8 | Example 8 | 15500 | 96.3 | 6.4 | 0.40 | 0.34 |
| 9 | Example 9 | 17200 | 97.1 | 5.7 | 0.36 | 0.35 |
| 10 | Example 10 | 18100 | 96.8 | 5.1 | 0.38 | 0.40 |
| 11 | Example 11 | 19900 | 97.0 | 5.3 | 0.39 | 0.39 |
| 12 | Example 12 | 16400 | 96.9 | 4.6 | 0.39 | 0.39 |
| 13 | Example 13 | 19200 | 97.0 | 6.2 | 0.40 | 0.35 |
| 14 | Example 14 | 20700 | 96.5 | 6.3 | 0.41 | 0.40 |
| 15 | Example 15 | 18800 | 96.3 | 5.8 | 0.39 | 0.52 |
| 16 | Example 16 | 11800 | 95.3 | 7.2 | 0.37 | 0.30 |
| 17 | Example 17 | 14500 | 95.7 | 5.2 | 0.38 | 0.31 |
| 18 | Comparative Experiment 1 | 15200 | 97.0 | 5.7 | 0.32 | 0.65 |
| 19 | Comparative Experiment 2 | 9200 | 95.4 | 4.9 | 0.39 | 0.30 |

COMPARATIVE EXPERIMENT 2

A catalyst component was obtained by following the procedure of Example 5, except the contact with 2,2,2-trichloroethanol was omitted. This catalyst component had a titanium content of 3.3%, an average particle diameter of 6 μm, and a PSDI value of 0.32.

APPLIED EXAMPLE 1

Under an atmosphere of nitrogen gas, 11.1 mg of the catalyst component obtained in Example 1, 4 ml of a solution containing 0.1 mol of triethyl aluminum (hereinafter referred to as "TEAL") per liter of n-heptane, and 1 ml of a solution containing 0.04 mol of phenyl triethoxy silane (hereinafter referred to as "PES") per liter of n-heptane were mixed and the resultant mixture was held at rest for five minutes. The mixture thus obtained was placed in a stainless steel autoclave provided with a stirrer and having an inner volume of 1.5 liters. Then, 300 ml of hydrogen gas as a molecular weight regulating agent and 1 liter of liquefied propylene were compressed into the autoclave. The reaction system thus prepared was heated to 70° C. and kept at this temperature for one hour to effect polymerization of propylene. After the polymerization was completed, the system was purged of unaltered propylene to obtain 229 g of a white polypropylene powder having a HI value of 97.0%, a MFR value of 7.1 g/10 minutes, and bulk density of 0.40 g/cm³ [Kc (amount of produced polymer in gram per gram of catalyst component)=20,600]. The particle size distribution (cumulative value) of the produced polymer was as follows.

| Less than 149 μm | 0% | 420~590 μm | 28.3% |
|---|---|---|---|
| 149~250 μm | 0.10% | 590~840 μm | 86.3% |
| 250~350 μm | 0.34% | 840~1000 μm | 94.5% |
| 350~420 μm | 0.97% | 1000~1680 μm | 99.8% |
| | | Over 1680 μm | 100% |

The PSDI value of the polymer was 0.27.

APPLIED EXAMPLES 20 AND 21

Propylene was polymerized by following the procedure of Applied Example 1, except ethyl benzoate (applied Example 20) and 2,2,5,5-tetramethyl piperidine (Applied Example 21) were used in the place of phenyl triethoxy silane. The results were as shown below.

| Applied Example | Kc (g/g-cat) | HI (%) | MFR (g/10 min.) | Bulk Density (g/cm³) | PSDI |
|---|---|---|---|---|---|
| 20 | 12400 | 95.2 | 8.1 | 0.37 | 0.32 |
| 21 | 10800 | 96.1 | 6.2 | 0.39 | 0.32 |

APPLIED EXAMPLES 22 AND 23

Propylene was polymerized by following the procedure of Applied Example 1, except the volume of a solution containing 0.04 mols of PES per liter of n-heptane and the volume of a solution containing 0.04 mol of ethyl benzoate (EB) per liter of n-heptane indicated below were used in the place of the solution of PES.

| Applied Example | Solution of PES (ml) | Solution of EB (ml) |
|---|---|---|
| 22 | 0.8 | 0.2 |
| 23 | 0.4 | 0.6 |

The results were as shown below.

| Applied Example | Kc (g/g-cat) | HI (%) | MFR (g/10 min.) | Bulk Density (g/cm³) | PSDI |
|---|---|---|---|---|---|
| 22 | 17600 | 96.5 | 5.3 | 0.40 | 0.29 |
| 23 | 14900 | 96.0 | 6.2 | 0.41 | 0.30 |

What is claimed is:
1. A supported titanium-containing catalyst component obtained by contacting

1. 
   I. a magnesium-containing solid obtained by contact of (A) magnesium metal, (B) a halogenated hydrocarbon represented by the general formula RX, wherein R stands for an alkyl, aryl or cycloalkyl group having 1 to 20 carbon atoms and X for a halogen atom, and (C) an alkoxy compound of the general formula $X_n^1M(OR^1)_{m-n}$, wherein $X^1$ stands for a hydrogen a halogen atom, or a hydrocarbon group having 1 to 20 carbon atoms, M stands for a boron, carbon, silicon, aluminum, or phosphorus atom, $R^1$ represents a hydrocarbon group having 1 to 20 carbon atoms, m represents the valency of said atom M, and $m > n \geq 0$, with
   II. a halogen-containing alcohol, and contacting the solid product obtained with
   III. an electron donor compound and a titanium compound.

2. The catalyst component in accordance with claim 1 wherein the Mg metal and the halogenated hydrocarbon are contacted so as to provide a Grignard reagent.

3. The catalyst component in accordance with claim 1 wherein R is an alkyl group having from 1 to 8 carbon atoms, cyclohexyl or an aryl group having 6 or 7 carbon atoms and X is chlorine, the alkoxy compound (C) is selected from the group consisting of $HC(OC_2H_5)_3$, $CH_3CH(CO_2H_5)_2$, $C(OC_2H_5)_4$, $Si(OC_2H_5)_4$, $Al(OC_2H_5)_3$, $B(OC_2H_5)_3$ and $P(OC_2H_5)_3$, the halogenated alcohol is selected from 2,2,2-trichloroethanol, 1,1,1-trichloro 2-propanol, 2,2-dichloroethanol, p-chlorophenol and 1-bromo-2-butanol, the electron donor is selected from di-n-butyl phthalate, ethyl benzoate and p-cresol and the titanium compound is selected from titanium tetrachloride, trichloroethoxy titanium, dichlorodibutoxy titanium, and dichlorodiphenoxy titanium.

4. The catalyst component in accordance with claim 3 wherein the halogenated hydrocarbon is n-butyl chloride, the compound represented by the formula $X_n^1M(OR^1)_{m-n}$ is one of orthoformate or ethyl orthoformate, the electron donor is one of di-n-butyl phthalate, ethyl benzoate, or para-cresol and the titanium compound is titanium tetrachloride.

5. The catalyst component in accordance with claim 1 wherein the alkoxy compound (C) is in contact with the magnesium compound in the amount such that the number of $OR^1$ groups in the alkoxy compound per magnesium atom exceeds 1.

6. The catalyst component in accordance with claim 5 wherein the ratio of alkoxy groups to the magnesium is in the range of 3 to 5.

7. The catalyst component in accordance with claim 1 wherein the amount of halogenated alcohol contacted with the magnesium-containing solid is in the range of 0.05 to 20 per gram atom of magnesium in the solid.

8. The catalyst component in accordance with claim 1 wherein the electron donor is contacted with the solid product in the range of 0.005 to 10 gram mols per gram atom of magnesium in the solid product and the titanium compound is contacted in the range of 0.1 gram mol to 100 gram mols per gram atom of magnesium in the solid product.

9. A method for the production of a supported titanium-containing catalyst component, which method comprises contacting
   I. a magnesium-containing solid obtained by contact of (A) magnesium metal, (B) a halogenated hydrocarbon represented by the general formula RX, wherein R represents an alkyl, aryl or cycloalkyl group having 1 to 20 carbon atoms and X for a halogen atom, and (C) a compound of the general formula $X_n^1M(OR^1)_{m-n}$, wherein $X^1$ represents a hydrogen atom, a halogen atom, or a hydrocarbon group having 1 to 20 carbon atoms, M represents a boron, carbon, silicon, aluminum, or phosphorus atom, $R^1$ represents a hydrocarbon group having 1 to 20 carbon atoms, m represents the valency of said atom M, and $m > n \geq 0$, with
   II. a halogen-containing alcohol, and contacting the solid product obtained with
   III. an electron donor compound and a titanium compound.

10. A catalyst system for the polymerization of olefins comprising
    i. the supported titanium-containing catalyst component of claim 1
    ii. an organo aluminum cocatalyst and
    iii. an electron donor which can be the same as the electron donor employed in the supported titanium-containing catalyst component or an electron donor compound selected from organic silicon compounds and electron donor compounds containing a nitrogen, sulfur, oxygen or phosphorus hetero atom.

11. The catalyst system in accordance with claim 10 wherein the organo aluminum component is aluminum triethyl and the electron donor compound is selected from phenyl triethoxy silane, ethyl benzoate, 2,2,5,5-tetramethyl piperidine, and mixtures thereof.

* * * * *